United States Patent [19]

Netherly

[11] 4,272,572
[45] Jun. 9, 1981

[54] VIBRATION ISOLATION STRUCTURE

[75] Inventor: Samuel G. Netherly, St. Paul, Minn.

[73] Assignee: Minnesota Mining and Manufacturing Company, St. Paul, Minn.

[21] Appl. No.: 83,642

[22] Filed: Oct. 11, 1979

[51] Int. Cl.³ .................. F16F 7/00; E04B 1/82; D02G 3/00
[52] U.S. Cl. .................. 428/35; 181/207; 181/285; 181/288; 181/294; 428/36; 428/398
[58] Field of Search ............ 181/207, 285, 288, 294; 428/35, 36, 398, 399

[56] References Cited

U.S. PATENT DOCUMENTS

| | | | |
|---|---|---|---|
| 1,926,509 | 9/1933 | Biertuempful | 181/294 |
| 1,968,456 | 7/1934 | Kliefoth | 181/294 |
| 2,087,973 | 7/1937 | Hermann | 181/294 |
| 3,330,377 | 7/1967 | Reed | 181/294 |
| 3,485,711 | 12/1969 | Fish, Jr. et al. | 428/113 |
| 3,508,991 | 4/1970 | Yunan | 156/209 |
| 3,535,181 | 10/1970 | Yunan | 156/181 |
| 3,542,618 | 11/1970 | DeVaughn | 428/398 |
| 4,110,499 | 8/1978 | Harrison | 428/35 |

Primary Examiner—William R. Dixon, Jr.
Attorney, Agent, or Firm—Cruzan Alexander; Donald M. Sell; Richard Francis

[57] ABSTRACT

An article especially suited for use as a vibration isolating or shock absorbing structure comprising a multitude of short, resiliently compressible, elastic, tubular, rubbery bodies held together in closely-packed relationship by restraining means. The rubbery bodies comprise a cured thermosetting millable extrudable composition having in the cured state an elasticity in excess of 200% and an elongation at break in excess of 300%. The tubular bodies are characterized by having a length to diameter ratio from about 2:1 to about 8:1 and a wall thickness of at least 0.025 inch.

12 Claims, 8 Drawing Figures

VIBRATION ISOLATION STRUCTURE

BACKGROUND OF THE INVENTION

1. Field of the Invention

This invention relates to an article comprised of an aggregate of restrained tubular rubbery bodies useful as a vibration isolation or shock absorbing structure.

2. Background of the Prior Art

Vibrations are caused by many sources, including, for example, the operation of heavy machinery, construction operations, such as digging, pile driving, and blasting, climatic conditions such as wind, thunder and earthquakes, and by other sources. The transmission of such vibrations through various rigid structures to other rigid structures creates numerous problems, such as premature wear, damage or destruction of equipment, occupational injury in some instances, interference with sensitive equipment used in the same vicinity, and other problems. In some instances, a brief, unexpected vibration can destroy or severly damage a fragile instrument, structure or work of art such as an intricate porcelain figurine. Vibration problems are particularly acute in areas for example where sensitive scientific equipment such as infrared spectophotometers, X-ray analysis equipment and the like are used in the same building or the same vicinity as heavy equipment such as a mineral crusher, mixer, punch press, or grinder. The vibration of such equipment can cause undesirable background noise in such instruments to such a degree as to interfere with or completely eliminate any accuracy which the instrument was engineered to exhibit.

Numerous attempts have been made to eliminate transmission of vibrations by either isolating the more sensitive piece of equipment, the vibration-inducing piece of equipment, or both, by means of devices designed to prevent the transmission or dampen or absorb unwanted vibrations. Such devices, known in many embodiments, are generally resilient or have a resilient element which may be interposed between structures to reduce or eliminate the transmission of vibrations therebetween. For example, springs have been used as vibration isolation elements with some success, but they do not generally perform completely satisfactorily. Other vibration isolation articles are known. For example, it is known to utilize segments of solid rubber of open- or closed-cell rubber foams as vibration isolation structures. The solid rubber isolators do not generally completely eliminate all transmission of vibrations. Foams, at the porosity necessary to provide satisfactory isolation, are subject to structural failure in a relatively short period of use. Resilient air bags which may be self-contained or connected to a continuous source of compressed air have also been employed as vibration isolation elements. Prior to the present invention, air bags have been the most efficient vibration-isolating elements, but these also fail after relatively short periods of use particularly under overload, and in a use environment which could perforate the bags.

SUMMARY OF THE PRESENT INVENTION

Briefly, the present invention provides an article especially suited for use as a vibration isolation or shock absorbing structure. The article of the invention comprises a multitude of short, resiliently compressible, elastic, tubular rubbery bodies held together in closely-packed relationship by a restraining means such as an adhesive binder or a container. The rubbery bodies comprise a cured thermosetting millable extrudable composition having in the cured state an elasticity in excess of 200% and an elongation at break in excess of 300%, preferably in excess of 450%. The tubular bodies, which may be either open or crimped, e.g., on ends to provide a pillow-like structure, are characterized by having a length to diameter ratio from about 2:1 to 8:1 and a wall thickness of at least about 0.025 inch.

The rubbery bodies are formed by first extruding "green" tube stock to form an elongate tubular structure which is cut into small segments of the appropriate size and which may be crimped either before, during or after cutting. The small segments are then restrained by either bonding them together as a block or by placing them loose in an appropriate container. Bonding may be by autogenous bonding or by the use of a tough adherent binder material. Curing, accomplished either before or after restraining, is by conventional means normally used in the rubber art.

The shape of the vibration isolating articles of the present invention may be any of a variety of shapes. For example, the shape may be rectangular, cubical, cylindrical, conical, and other shapes.

DRAWINGS

The invention may be further understood by reference to the following detailed description when considered in conjunction with the accompanying drawings, wherein.

DETAILED DESCRIPTION OF THE INVENTION

Figure 1:
FIG. 1 is a front elevational view of a segment of one embodiment of the present invention comprising blocky vibration isolating article containing rubbery pillows.

Referring now to the drawings, particularly FIG. 1, there is shown a segment 10 of a vibration isolating article. Vibration isolating article 10 consists of a multitude of closely-packed, short, resiliently compressible rubbery pillows 11 adhesively bonded together at points of mutual contact. Adhesive bonding may be by means of a tough adherent binder which generally will coat pillows 11 and which forms a tough adhesive bond between contacting pillows 11.

Pillows 11 are characterized by having a tubular wall defining an interior cavity and being crimped on either end by crimps 14. Crimping is preferably done in a manner to completely fuse the contacting portion of interior tube walls together, although this is not required for the satisfactory performance of the product.

Figure 2:
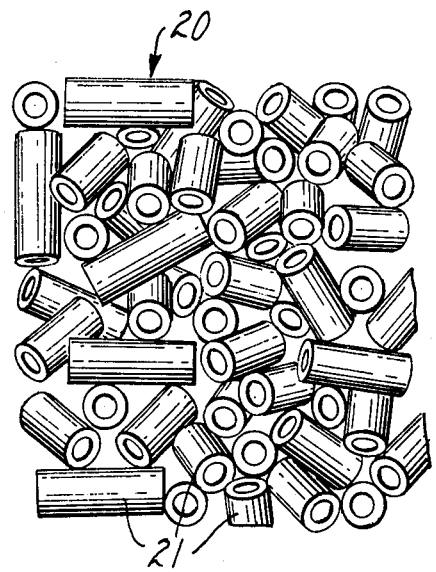
FIG. 2 is a front elevational view of a segment of another embodiment of the present invention comprising vibration isolating article containing open-ended tubular rubbery bodies.

In fact, FIG. 2 shows a segment 20 of a vibration isolating structure comprised of a multitude of short, resiliently compressible, elastic, uncrimped, open, tubular rubbery bodies adhesively held together in closely-packed relationship. The tubular bodies 21 are similar to the tubular pillows of FIG. 1, except tubular segments 21 are not crimped.

Figure 7:
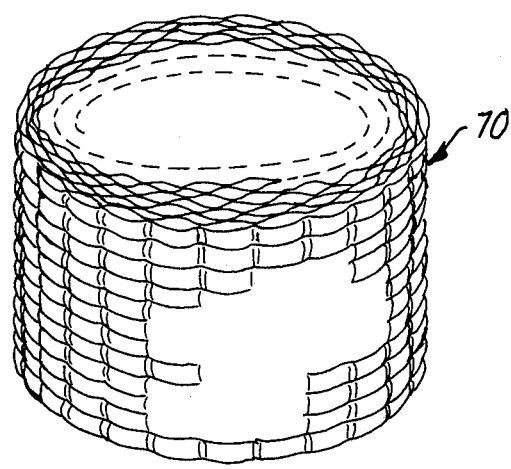
FIG. 7 is a perspective elevational view of another embodiment of a vibration isolating article of the invention.
Figure 8:
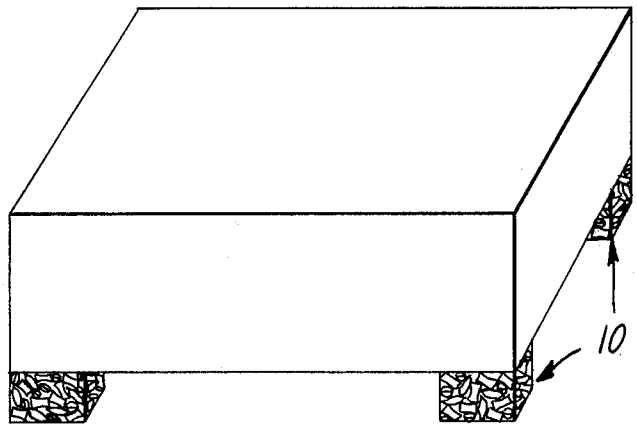
FIG. 8 is a perspective elevational view of a piece of heavy machinery (shown only as a rectangular block) borne upon blocks of vibration isolating material such as that depicted in FIGS. 1 or 2.

FIG. 7 shows yet another embodiment of the vibration isolating article of the present invention in the form of a cylindrical structure 70 characterized by being a convolutely wound roll of tube stock which has been crimped at intermittent locations to provide endwise-connected short tubular sections to form a cylindrical structure. Thus, as shown in FIGS. 1 and 2, the rubbery bodies may be in a random configuration within the vibration isolating article or, as shown in FIG. 7, they may be in an ordered pattern provided by either winding a string or blanket of connected tubular segments or by stacking the segments of tubular bodies in an ordered manner.

Yet another embodiment of the vibration isolating article of the present invention may be provided by restraining a loose mass of the rubbery bodies within a container having rigid or flexible walls. Such a container may have an opening sufficient to accommodate a movable compression member having a surface adapted to make compressive contact to at least one portion of the mass and, when contacted, to compress the mass between the walls and the surface. The container may be provided by a simple cylindrical container having a flat bottom, for example. The movable compression member may be provided by a member similar in shape to a piston adapted to fit within a relatively close tolerance within but preferably not touching the walls of the cylindrical container and having a face which contacts the top surface of the mass of rubbery bodies within the container. The container would be fastened or placed upon one structural member while the movable compression member would be fastened to another to provide vibration isolation between the two structural members, provided the two structural members are not otherwise connected. A useful arrangement of this embodiment would call for the structural member having mounted to its bottom surface the piston-like movable compression member so that it rests on the top surface of the mass of rubbery bodies while being isolated from the walls of the container, thereby causing all of the vibrations to be transmitted to the mass of rubbery bodies.

Rubbery bodies are formed of a thermosetting millable extrudable composition which, in the cured state, should have an elasticity of at least 200% and an elongation at break in excess of 300%, to be sufficiently resilient to provide an adequate degree of vibration isolation when restrained as a closely-packed mass. Additionally, to achieve proper packing of the tubular rubber bodies to form a suitable vibration isolating article according to the invention, the tubular bodies should have a length diameter ratio of about 2:1 to about 8:1. Shorter tubular bodies tend to pack too densely and not provide adequate isolation of vibrations. Longer tubular bodies tend to pack more poorly, providing a structure which is too compressible which will generally not properly and firmly support many heavy members which will be placed upon it.

The tubular rubber bodies should also have a wall thickness of at least 0.025 inch to provide sufficient structure once the tubular body is incorporated in the vibration isolating article. Preferably, the wall thickness will be in the range of approximately 0.075 inch to about 0.25 inch but may be as thick as about 2 inches. The outer diameter of the tubular rubbery bodies can typically vary between about $\frac{1}{8}$ inch to about 6 inches, although useful vibration isolation articles according to the present invention may be produced outside of this range. When the tubular rubber body is made into a pillow-like shape, the internal cavity of the pillow will typically have a volume in the range of about 10% to about 70% of the total volume of the pillow.

The tubular bodies of the vibration isolating articles of the present invention are made by extruding thermosetting millable extrudable curable polymeric material using a conventional extruder fitted with an extrusion of die of the known variety for extruding tube stock. The polymeric material should be formulated so that it may be cured after the extrusion and crimping operations and to facilitate formation of the rubbery bodies, without distortion.

Figure 4:
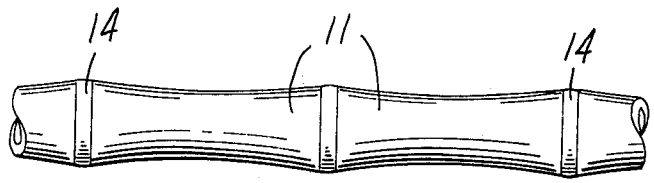
FIG. 4 shows a top plan view of the crimped tubular material of FIG. 3.
Figure 5:
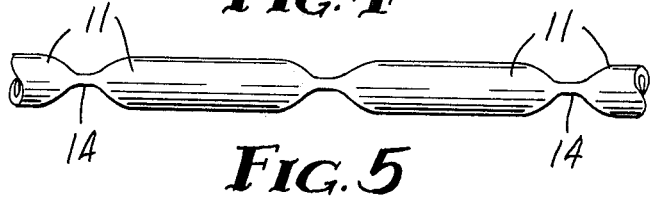
FIG. 5 shows a side view of the crimped tubular material of FIG. 3.
Figure 3:
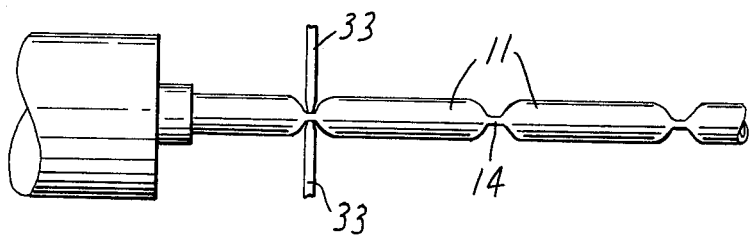
FIG. 3 shows a schematic drawing of tubular material being extruded and crimped to produce rubbery bodies which may be employed to produce vibration isolating articles according to the present invention.

Crimping may be accomplished by employing a set of opposed crimping elements 33, movable toward each other, as depicted in FIG. 3, to impinge upon the surface of the "green" tube stock to cause the inner walls of the tube stock to fuse together to form a bond. The surfaces of crimping elements 33 which contact the "green" tube stock should be generally flattened so that a portion of the length of the "green" tube stock is compressed between the surfaces of contacting elements 33. If a crimping apparatus is employed as depicted in FIG. 3, the resultant crimped tube stock would remain as an elongate crimped tubular strip as depicted in FIGS. 4 and 5. Such a strip would require cutting within the crimp, to produce the pillow-like structure.

Figure 6:
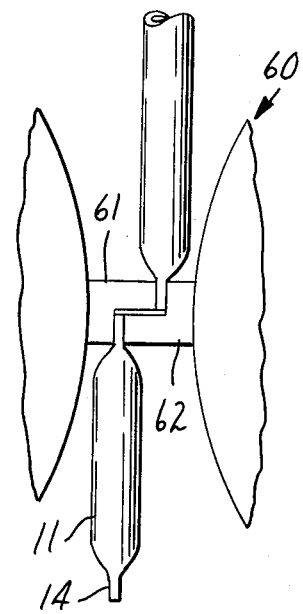
FIG. 6 shows an enlarged detailed side view of an alternative embodiment of a crimping apparatus which may be employed to simultaneously crimp and cut the tube stock of FIG. 3.

There are other devices available which will simultaneously crimp and cut to produce individual pillow-like shapes which are crimped on the ends. For example, FIG. 6 shows an enlarged view of a crimping apparatus 60 which has opposed movable elements 61 and 62 which have matching step-like surfaces which will crimp a segment of tube stock therebetween while stretching or tensioning the tube stock therebetween to cause it to break. Such an arrangement would be useful for producing cut pillow-like shapes from tube stock which is susceptible to breaking in such an arrangement. A more tenacious tube stock would perhaps require a separate knife-cutting operation.

The rubbery bodies employed in the shock absorbing articles of the present invention are formed of a cured thermosetting millable extrudable composition which has in the cured state an elasticity in excess of 200% and an elongation at break in excess of 300%. The materials meeting this criteria are normally polymeric materials. Suitable polymeric materials for this purpose include polychloroprene, e.g., that sold under the trade designation "Neoprene" of the "T" family and "W" family, natural rubber, nitrile rubber, styrene-butadiene rubber, styrene-butadiene block copolymer, e.g., that sold under the trade designation "Kraton" 107, butyl rubber and reclaimed millable rubber. The preferred polymeric material is polychloroprene.

The polymeric material may be blended with various additives known in the rubber formulating art. For example, the polymeric material may include up to about 80% by weight fillers for reasons of economics and to alter the physical properties of the tubular rubbery body. Certain fillers act as reinforcing agents to strengthen polymeric material while certain other fillers act merely as extenders thereby reducing the overall cost of the article.

Other known additives may also be employed such as colorants, antioxidants, processing aids, and the like. Useful fillers will generally have a particle size on the order of 1 micron to 1,000 microns. Some examples of filler materials which have been found to be useful include particulate rubbery material such as that obtained from buffing the white sidewalls of new automobile tires or that recovered from pulverizing used automobile tires, calcium carbonate, silica, sawdust, particulate thermoplastic material such as particulate polyvinyl butyral, glass particles such as glass beads, hollow bubbles, glass dust, and mixtures thereof.

The polymeric material and any of the above additives are intimately mixed on a rubber mill or other suitable device, e.g., a Banbury sigma-blade mixer, with a curing agent and the composition is milled into a form suitable for extrusion. A conventional rubber mill may be employed for this purpose.

In referring to the composition from which the particular bodies are extruded, the term "millable" refers to rubbery compositions which can be processed on steel roller equipment, e.g., on a rubber mill or calender, in the same manner as natural rubber. The polymeric material may be broken down or softened by action of the mill, and fillers, pigments, and other compounding materials may be blended into the softened polymeric material on the mill. Similarly, the term "extrudable" as herein used means that the composition is capable of being extruded using a conventional extruder which is a well-known device for forcing plastic material through an orifice, specifically in the present case, an orifice capable of producing a continuous tubular shape.

The binding material which is employed to adherently bond the tubular rubbery bodies together may be any compatible bonding material which performs this function. The binder material has an initial liquid state and is capable of being poured, sprayed or otherwise coated upon the surface of the rubbery bodies, and cures to form a tough adherent bond which adequately holds the rubbery bodies together in use situations. Since the use situations may vary from a very minor degree of vibration to an extremely intensive vibration situation, the binder material may be selected for its strength depending upon the particular use. The preferred binder for most use situations is a liquid curable polyurethane composition sold under the trade designation "Adiprene" BL-16. Another useful bonding material is an acrylic latex such as that sold under the trade designation "Hycar" 2679.

The tubular bodies may be bonded together by placing them in a mold of the appropriate size and shape, after preferably first spraying the interior surfaces of the mold with a suitable release material, supplying liquid curable binder material to the tubular bodies to completely coat them, removing excess liquid binder material, and curing the resultant coated tubular bodies to form an integral structure. The resultant structure may then be removed and used as is as a vibration isolation article, if it has been molded to the proper shape and size. Large blocks of vibration isolating material may be prepared and subsequently cut to size by employing conventional cutting equipment such as a band saw without regard to the areas where the pillows are adhered to each other or crimped.

Other modifications of the vibration isolating structure of the present invention are also possible without departing from the scope of the invention. For example, the vibration isolation structure may be provided with an elastic coating to make it more aesthetically pleasing to the observer. Additionally, posts, plates or other mounting devices may be fastened on or within the structure of the vibration isolating block to provide a means of attachment. Such fastening may be accomplished after adherently bonding the rubbery bodies together or before. Other modifications are also possible.

The invention is further illustrated by the following examples wherein all parts are by weight, unless otherwise specified.

EXAMPLE 1

| Addition Order | Parts | Ingredients |
|---|---|---|
| 1 | 25 lbs. | Polychloroprene rubber, chips, sold under the trade designation "Neoprene" type W |
| 2 | 227 grams | Powdered antioxidant, sold under the trade designation "Neozone" A |
| 3 | 454 grams | Powdered anhydrous magnesium oxide curing agent sold under the trade designation "Maglite" A |
| 4 | 568 grams | Powdered zinc oxide curing agent |
| 5 | 227 grams | Finely divided sulfur |
| 6 | 25 lbs. | Particulate rubber filler 30-240 mesh, ground white wall tire buffing having range of 0.002 to 0.03 inch |
| 7 | 56.8 grams | Ethylene thiourea curing accelerator |

Rubber pillows having an outside diameter on the order of ¼ inch, a wall thickness varying between about 0.1 inch and 0.075 inch were produced of the ingredients shown above. The polychloroprene rubber was milled to form a continuous band on a conventional 48 inch rubber mill. Next were added with milling to blend each ingredient separately, the "Neozone" A antioxidant, anhydrous magnesium oxide, powdered zinc oxide, and the finely divided sulfur. After complete blending, the banded stock was cut from the roll and the nip between the steel rolls widened about 50% and the stock again banded. The particulate rubber filler was added with further milling until a homogeneous blend had been achieved (approximately 10 minutes). The ethylene thiourea was then added with additional milling and the mixture slit from the mill roll to form a long strip, approximately 1 to 3 inches wide. This strip was then fed into the hopper of a conventional rubber extruder fitted with a tubular extrusion die having an orifice outer diameter of 0.25 inch and an orifice inner diameter of 0.155 inch.

The extruded tube stock was somewhat grey in color, having an irregular texture resembling heavy, coarsegrained leather. The extruded tube stock was placed in a 250° F. oven for 1¾ minute to soften the rubber and then passed through a rubber pillow crimping apparatus consisting of a set of two counter-rotating gears having a 3½ diameter and a number 3 pitch, meshing together in a tooth tip against tooth tip fashion with little or no clearance between the gear teeth tips at the point of closest approach. The tube stock was fed into the nip between gears as the gears turned, causing the gears to exert a pinching and shearing action on the tubing to produce a string of loosely connected pillow-shaped objects that were on the average 1 inch long. The rubber pillows were then easily separated from each other by hand and placed into a casting mold made from four 8 inch by 5½ inch by ⅛ inch thick aluminum plates taped together on the edges to form a rectangular box open on the top and bottom with an 8×8 inch opening. The openings were then covered with two 8 inch square by ¼ inch thick steel plates that had been abraded on their mold surface to remove surface scale and irregularities. The inner surfaces of the mold had been previously sprayed with a nonadherent release agent to facilitate removal of the aluminum side plates.

After the bottom steel plate had been taped into place with the abraded surface facing inward, 2800 grams of loose "green" pillows described above were placed into the mold and leveled to within ¼ inch of the top. A liquid resinous mixture consisting of 75 parts by weight polyurethane resin sold under the trade designation "Adiprene" BL-16, 16.4 parts of "Cellosolve" acetate, and 8.8 parts methylene dianiline was poured over the pillows until the resin covered the entire mass of the pillows and the top steel plate was then taped into place with the abraded surface facing in. Some of the tape was then removed from the bottom edges of the mold to allow excess resin to drain out and the assembly left to drain for approximately twenty minutes.

The mold and its contents were then placed in a forced air oven heated at approximately 300° F. and left therein for approximately 3 hours. Thereafter, the mold and its contents were removed, the tape removed to reveal a rectangular block of adherently bonded pillows with the steel top and bottom plates adherently attached to the block which was then returned to the oven for an additional one hour of curing.

After cooling, the block was weighed and found to contain between about 170 and 200 grams of resin binder. Four pillow blocks were formed in this manner, each measuring 8 inches by 8 inches by 5½ inches, and each having a top and bottom steel plate on each 8 inch by 8 inch side.

The blocks were then tested for compressive strength using a compression testing device sold under the trade designation "Instron" by applying a 5000 lb. load on each block. No damage was observed after 3 minutes of compression. The blocks were then tested in a use situation by placing them at the four corners of a rectangular plate employed as a base plate for a mineral crusher having a gross weight of approximately 8000 pounds. This crusher had previously been supported by a commercial vibration isolating device consisting of four air bags which were continuously connected to a live air supply and which required replacement because of puncture or other failure every three months. The blocks of this example were utilized with this equipment for approximately 2½ years with excellent vibration isolation and no observable damage to the isolation device.

EXAMPLE 2

Rubber tube stock was made of substantially the same ingredients described in Example 1, except the particulate rubber filler had an average particle size in the range of 0.002 to 0.03 inch (30–240 mesh) and consisted of a filled urethane elastomeric material comprised of 35% by weight urethane and 65% by weight finely divided silica (400 mesh and finer) and containing approximately one pound of yellow pigment.

Approximately 378 grams of the yellow pillows as described in Example 1 of approximately the same size, moistened with an acrylic latex resin (sold under the trade designation "Hycar" latex 2679), were placed in a common 6 inch diameter funnel with the narrow end down. The interior surface of the funnel had been previously sprayed with a mold release agent. The funnel containing the pillows was then placed in a forced air oven heated at 200° F. for approximately 2 hours. Upon removal, the resultant conical aggregate of yellow pillows was totally submerged in the acrylic latex resin, removed, allowed to drain for five minutes, and then placed in a 260° F. forced air oven for approximately 2 hours, to complete a cure of the latex. Three other conical shaped structures were produced in the same manner.

The four structures were then placed on a table with the small ends upward and a steel plate measuring 27 inches by 18 inches by 1½ inch thick was placed on top of the structures and the plate was employed as a support for a spectrophotometer. The measurements taken of the vibrations revealed that the floor in the room in which the instrument was placed was moving 135 millionths of an inch vertically. It was found that the table top on which the instrument was resting was moving 1300 millionths of an inch vertically. The metal slab, resting upon the four vibration isolating structures of the invention, was only moving 70 millionths. This was a reduction in vibration of 95%.

EXAMPLE 3

Tube stock having an outer diameter of approximately ⅜ inch was prepared of the composition described in Example 1. The composition was fed into an extruder and extruded with tubular extrusion die having an outer orifice diameter of 0.375 inch and an inner orifice diameter of 0.272 inch. The extruded tube stock was approximately ⅜ inch in outer diameter.

The tube stock was heated in a forced air oven at 260° F. for 1¾ minute then passed through a crimping apparatus consisting of two counter-rotating gears, as described in Example 1, except that every other tooth was missing, resulting in a string of connected pillows which were approximately 1½ inch long each. The pillows were completely separated while still warm, and dropped into a rectangular aluminum mold having an interior size of 8×8 by 7½ inch high. The mold was made from ⅛ inch thick perforated aluminum plates having a quarter inch round hole in each square inch of plate surface. The mold was filled so that there was a mass of pillows 6 inches deep and the mold and its contents were placed in a forced air oven heated at 260° F. for one hour. The mold was then removed from the oven and allowed to cool overnight. The resultant pillow block was gently slid out of the mold in one piece. (The rubber formulation had sufficient tack such that resultant pillows were autogenously bonded together from the heat of the oven or from the residual heat from the heated tube stock.) The resultant 8 inch by 8 inch by 6 inch block was then dipped into a barrel of acrylic latex resin (sold under the trade designation "Hycar" 2679) and allowed to drain for 5 minutes. The drained block was then placed into a forced air oven heated at 260° F. for 90 minutes. The block was removed, allowed to cool and dipped again in acrylic latex. After draining for 5 minutes, the block was then returned to the 260° F. oven for an additional 90 minutes of curing.

The resultant block was then cooled and cut diagonally to produce two identical equilateral right triangles 6 inches wide on the short side and 8 inches long. The triangular blocks were then cut in half to produce four triangular shaped pieces 3 inches thick. The four triangular shaped pieces were then placed on a laboratory bench top with the longest face of the block flat on the bench top and a 12 inch by 18 inch by 2 inch thick steel plate was placed on the top of the blocks so that the points of the triangular shaped pieces were under the corners of the steel plate. Two 12 inch by 18 inch by 1 inch thick steel plates were placed on the top of the first plate and an analytical balance capable of measuring to an accuracy of a tenth of a milligram was placed on the top of the plates. Previously, the balance had been unusable while certain heavy equipment in the building was operating because of vibration. After the installation of the vibration isolation devices described above, no vibration could be detected while reading the balance, regardless of operation of equipment.

The devices of the present invention may be used in conjunction with other vibration isolating devices. Other modifications may be possible without departing from the scope of the claim.

What is claimed is:

1. An article especially suited for use as a vibration isolating or shock absorbing structure comprising a multitude of short, resiliently compressible, elastic, tubular, rubbery bodies held together in closely-packed relationship by restraining means, wherein said rubbery bodies comprise a cured thermosetting millable extrudable composition having in the cured state an elasticity in excess of 200% and an elongation at break in excess of 300% and wherein said tubular bodies are characterized by having a length to diameter ratio from about 2:1 to about 8:1 and a wall thickness of at least about 0.025 inch.

2. The article of claim 1 wherein said restraining means comprises a container characterized by walls sufficient to contain a loose mass of said rubbery bodies under compression and an opening sufficient to accommodate a movable compression member having a surface adapted to make compressive contact with at least one portion of said mass and, when contacted, to compress said mass between said walls and said surface.

3. The article of claim 1 wherein said restraining means is a tough adherent adhesive binder which bonds said rubbery bodies together at points of mutual contact.

4. The article of claim 1 wherein said composition comprises a polymeric material selected from the group consisting of polychloroprene, natural rubber, nitrile rubber, styrene butadiene rubber, styrene-butadiene block copolymer rubber, butyl rubber, and reclaimed millable rubber.

5. The article of claim 1 wherein at least a portion of said tubular rubber bodies are crimped to provide at least one crimp along the length of each crimped tubular rubber body such that adjacent wall portions are at least partially fused together.

6. The article of claim 5 wherein said crimps are at opposed ends of the tubular rubbery body to provide pillow-like shapes.

7. The article of claim 1 wherein the outer diameter of said tubular rubber bodies is within the range of $\frac{1}{8}$ inch to 6 inches and the wall thickness of said tubular rubber bodies is within the range of 0.025 inch to 2 inches.

8. The article of claim 6 wherein pillow-like shapes are characterized by having an internal cavity which has a volume in the range of 10% to about 70% of the total volume of said pillow-like shape.

9. The article of claim 1 wherein said composition is a filled composition containing up to 80% by weight fillers.

10. The article of claim 9 wherein said fillers are selected from a group consisting of particulate rubber, silica, particulate wood, particulate thermoplastic material, glass bubbles, calcium carbonate, colorants, and mixtures thereof.

11. The article of claim 3 wherein said binder material is polyurethane.

12. An article especially suited for use as a vibration isolating or shock absorbing structure comprising a multitude of closely-packed, short, resiliently compressible rubbery pillows adhesively bonded together at points of mutual contact by means of a tough adherent polyurethane binder wherein said rubbery pillows are formed of filled thermoset millable extrudable polychloroprene rubber having an elasticity in excess of 200% and elongation at break in excess of 450% and are characterized by having a length to diameter ratio of 2:1 to about 8:1, a wall thickness of at least about 0.075 inch, and an internal cavity which has a volume in the range of about 10% to about 70% of the total volume of said pillow-like shape.

* * * * *